Patented May 17, 1927.

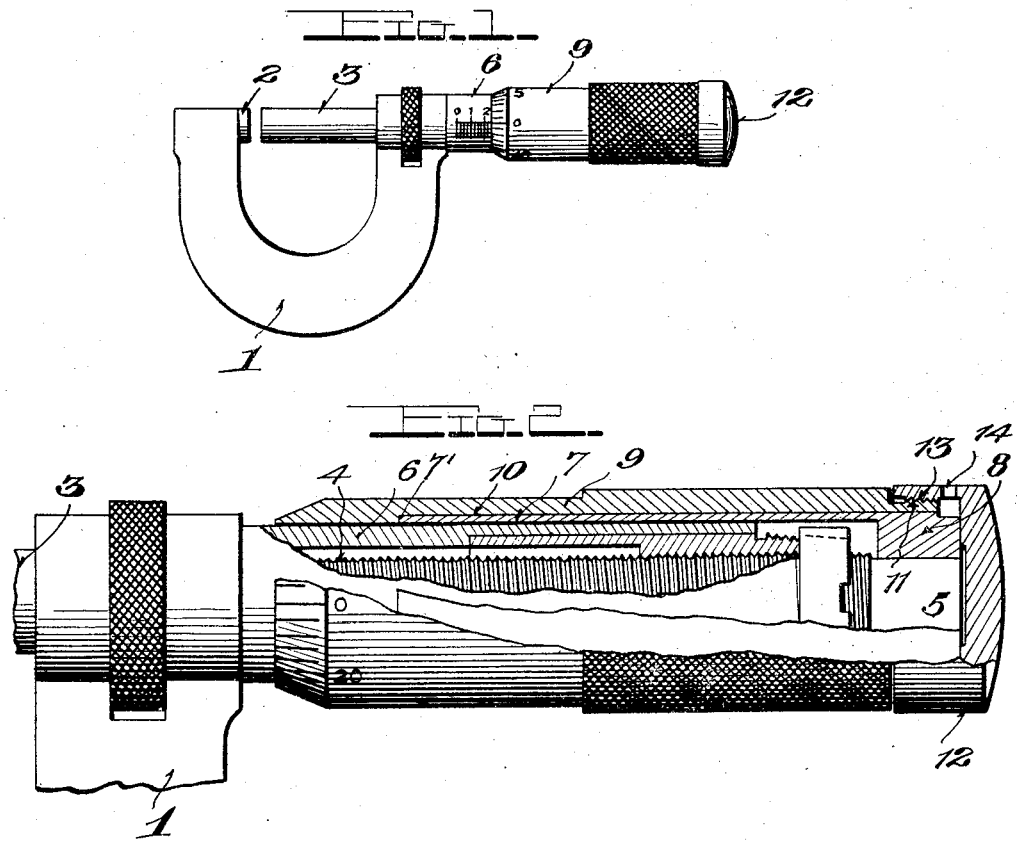

1,629,406

UNITED STATES PATENT OFFICE.

JOHN W. PARKER, OF BARRINGTON, RHODE ISLAND, ASSIGNOR TO BROWN & SHARPE MFG. CO., OF PROVIDENCE, RHODE ISLAND.

MICROMETER GAUGE.

Application filed August 6, 1926. Serial No. 127,558.

This invention relates to certain new and useful improvements in micrometer gauges and the primary object thereof is to provide improved means for adjusting the graduated rotatable sleeve so as to bring the zero mark into correct position, upon wear of the anvil or for other cause disturbing the sleeve adjustment.

A further object of the invention is to provide simple and economical means which can be easily and quickly manipulated and which at the same time effectively retains the adjustment.

In the drawings:—

Fig. 1 is a side elevation of a micrometer gauge constructed in accordance with the present invention; and Fig. 2 is an enlarged detail view, in side elevation and partly broken away and in section.

The bowl 1 of the gauge is provided with anvil 2, spindle 3, and measuring screw 4, the latter having a smooth circular end 5, the spindle 3 measuring screw 4 and end 5 usually being formed in one piece. The barrel 6 encloses the screw 4 and receives over its exterior a long tube 7, the latter being formed at its outer end with a thick solid ring 8 which is rigidly secured to end 5 of the screw 4.

The usual graduated sleeve 9 is cut out at 10 on its inner circumference to receive the tube 7 therein, so that the inner circumference of the tube 7 and sleeve 9 are in accurate registry by reason of the abutment 7' formed on the sleeve 9 against which the tube 7 is seated.

The periphery of the outer end of the sleeve 9 is reduced and threaded as indicated at 11 and receives thereover a cap 12 which latter is threaded at 13 to engage with the threads 11 and preferably has a wrench-engaging hole 14 formed therein. The tube 7 is secured to the end 5 of the screw 4 by soldering or otherwise.

To adjust the graduated sleeve 9 to bring the zero mark in proper position, the spindle 3 is first properly seated on the anvil 2, and then the cap 12 is removed or slightly unscrewed, so as to permit the sleeve 9 to be rotated with respect to the threads of the spindle 3, whereupon the sleeve 9 is rotated to bring its zero mark in register with the zero mark of the barrel 6. With the parts held in this position, the cap 12 is then tightened or moved inwardly, which causes the outer end of the sleeve 9 to frictionally engage and be frictionally locked to the solid ring 8, of the tube 7, thereby connecting the sleeve 9 to the end 5 of the screw 4.

Having thus described my invention, what I claim as new and desire to secure by Letters Patent is:—

1. In a micrometer gauge in combination with the barrel and the measuring screw a graduated sleeve rotatable about the barrel having a cut-out on its inner circumference, an elongated tube abutting the inner end of the cut-out portion and a ring at its outer end rigidly secured to end of the screw, said graduated sleeve having a peripherally reduced and exteriorly threaded outer end and a cap engaged over the threaded end of the sleeve for frictionally locking the latter onto the ring of the tube.

2. In a micrometer gauge in combination with the spindle the measuring screw and the graduated sleeve thereof, an elongated tube secured to the spindle and disposed within the graduated sleeve, the outer end of the graduated sleeve being threaded, and a cap for frictionally locking the outer end of the sleeve to the outer end of the tube.

3. In a micrometer gauge in combination with the spindle, the measuring screw and graduated sleeve having an abutment formed upon the interior thereof, an elongated tube seated upon the said abutment at one end and rigidly secured to the measuring screw at the opposite end, and means for frictionally connecting the graduated sleeve and measuring screw to cause them to move in unison.

In testimony whereof I have signed my name to this specification.

JOHN W. PARKER.